May 22, 1951 W. J. PARDUCCI 2,553,867
POWER PLANT
Filed May 24, 1946
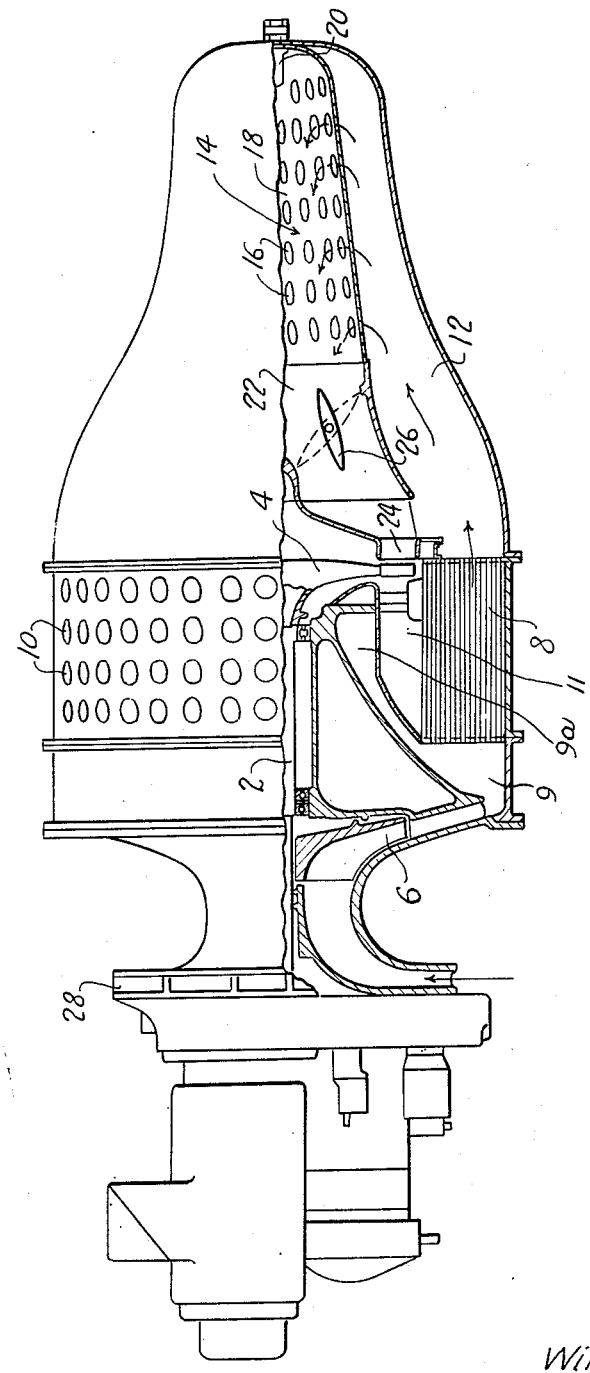
INVENTOR.
William J. Parducci
BY
Hauke & Hardesty
ATTORNEYS Patented May 22, 1951

2,553,867

UNITED STATES PATENT OFFICE 2,553,867

POWER PLANT

William J. Parducci, Detroit, Mich., assignor to Continental Aviation & Engineering Corporation, Detroit, Mich., a corporation of Virginia Application May 24, 1946, Serial No. 672,124

1 Claim. (Cl. 60—41)

This invention relates to a power plant such as is embodied in a gas turbine unit for aircraft.

Weight is a compelling factor to be considered in aircraft design. In order that weight of the aircraft be kept to a minimum, it is imperative that power plants to be used in the aircraft be designed as compactly and efficiently as possible consistent with performance requirements.

It is the object of this invention to provide a power plant of the gas turbine type which is compact without sacrificing efficiency. This is accomplished by a new arrangement of the component parts of the entire power plant.

The sole figure of drawing shows a power plant made according to this invention in partial section along a line of symmetry, in this case the axis of the turbine shaft.

The turbine shaft 2 carries a turbine wheel 4 and an air pump or compressor 6. Compressor 6 supplies air under pressure to an air chamber 9 surrounding the shaft 2 and thence to a heat exchanger 8. Said air chamber 9 is provided with an axial extension 9a of reduced diameter which extends intermediate the heat exchanger 8 and the shaft 2 and thereby shields the shaft from the annular exhaust collector ring. Heat exchanger 8 comprises merely a plurality of tubes spaced about the turbine wheel 4 in an annulus in such a way that the heat exchanger is largely behind the turbine wheel. In other words, heat exchanger 8 is adjacent to the exhaust side of wheel 4. Exhaust gases leaving the turbine blades are conducted first into the annular exhaust gas collector ring 11 and then move radially outward around the heat exchanger tubes and through openings 10 in the outer envelope of the turbine. The heat exchanger tubes form a part of the air passage communicating compressor 6 with an annular air chamber 12. Air chamber 12 envelopes or encompasses combustion chamber 14 and communicates therewith by means of openings 16 in the wall 18 between the combustion chamber and the air chamber. Means to supply fuel, such as a nozzle 20, are provided, preferably at the end of the combustion chamber farthest removed from the turbine wheel. It will be seen that the axis of symmetry of combustion chamber 14 is coaxial with shaft 2.

An annular passage 22 communicates combustion chamber 14 with fluid energy nozzles 24. Nozzles 24 are preferably arranged in the form of a conventional diaphragm, not shown here in detail. If desired, a valve 26 may be provided in the passage 22 to keep fluid energy from passing to some of the nozzles.

Operation

In operation, air enters the annular inlet 28, is compressed in the pump 6, picks up heat in passing through heat exchanger 8 into chamber 12, and reverses direction in going from air chamber 12 into combustion chamber 14. In combustion chamber 14 fuel is added by means of nozzle 20 and is burned. The hot mixture passes to nozzles 24 in which heat and pressure energy are converted into kinetic energy, and the gas impinges on the blades of turbine wheel 4. The exhaust gas leaving the turbine wheel passes radially outward through the heat exchanger 8 and openings 10.

It will be seen from the foregoing that the disposition of the combustion chamber at one end of the turbine and the air compressor at the opposite end has the advantage of keeping the air compressor away from the hottest portions of the heat engine. With this arrangement, the compressor may be made of light-weight low melting point alloys, reducing the weight of the power plant. It will further be understood by those skilled in the art that the annular air chamber encompassing the combustion chamber has the advantage of diminishing heat losses from the combustion chamber.

I claim:

In a gas turbine power plant, a rotatably mounted shaft, a casing structure, an air compressor driven by said shaft and disposed at the forward end of said casing, said casing structure providing inlet and outlet means for said air compressor, a turbine wheel mounted on said shaft and disposed about midway of said casing, a combustion chamber disposed symmetrically with respect to the axis of said shaft and adjacent to the turbine wheel opposite the compressor, said casing having one air chamber coaxially surrounding the shaft and disposed forwardly of the turbine wheel and a second air chamber coaxially surrounding the combustion chamber and disposed rearwardly of the turbine wheel, said second air chamber having a gradual diminishing cross-sectional area in the direction of the air flow, said combustion chamber wall portion remote from the turbine wheel provided with openings so that air from said second air chamber may flow into said combustion chamber, exhaust means communicating said combustion chamber with said turbine wheel, an annular exhaust gas collector chamber disposed in the first air chamber, said first air chamber having an axially extending annular portion of reduced external diameter substantially closely surrounding the shaft portion forwardly of and adjacent to the turbine wheel and disposed to extend between the annular exhaust gas collector chamber and shaft to shield the shaft from the heat of said exhaust gas collector chamber, and a heat exchanger disposed longitudinally through said exhaust gas collector chamber and connecting said first and second air chambers.

WILLIAM J. PARDUCCI.

REFERENCES CITED

The following references are of record in the file of this patent:

UNITED STATES PATENTS

| Number | Name | Date |
| --- | --- | --- |
| 2,085,761 | Lysholm | July 6, 1937 |
| 2,162,956 | Lysholm | June 20, 1939 |
| 2,358,301 | Brauns | Sept. 19, 1944 |
| 2,454,310 | de Ganahl | Nov. 23, 1948 |
| 2,476,179 | Cameron | July 12, 1949 |

FOREIGN PATENTS

| Number | Country | Date |
| --- | --- | --- |
| 541,845 | Great Britain | Dec. 15, 1941 |